United States Patent Office 3,350,389
Patented Oct. 31, 1967

3,350,389
PROCESS FOR THE PREPARATION OF PHOSPHORUS-CONTAINING SUCROSE POLYOLS
John T. Patton, Jr., Wyandotte, and Robert J. Hartman and Arthur L. Austin, Southgate, Mich., assignors to Wyandotte Chemicals Corporation, Wyandotte, Mich., a corporation of Michigan
No Drawing. Filed Dec. 30, 1964, Ser. No. 422,396
12 Claims. (Cl. 260—234)

This invention relates to a process for the preparation of phosphorus-containing polyols. More particularly, this invention relates to a process for the preparation of phosphorus-containing sucrose polyols.

Phosphorus-containing polyols are well known in the art and have recently been the subject of many patents and literature articles. One reason for the interest in these polyols is that they are excellent flame retardant agents, especially for polyurethane compositions. Several kinds of phosphorus-containing polyols have been prepared and employed in polyurethane compositions. One particularly useful series of phosphorus-containing polyols are the alkylene oxide adducts of the products prepared by the reaction of polyols with acids of phosphorus. Numerous polyols and acids have been employed in this reaction. Depending upon the reactants selected, a variety of different products may be prepared. Polyols of high functionality are preferred reactants, particularly in rigid polyurethane foams, since they possess high cross-linking capability and, therefore, impart high rigidity to the ultimately-prepared polyurethane compositions due to the high cross-linking density. However, use of these compounds has been made extremely difficult, primarily because of the problems encountered in their processing. Of particular interest has been the use of sucrose in the preparation of phosphorus-containing polyols. Besides containing high functionality, sucrose is a bicyclic compound and it is established that ring systems contribute advantageously to the ultimate strength of polyurethane compositions prepared therewith. In addition, and not to be lightly discarded, is the fact that sucrose is economically expedient. However, heretofore no satisfactory process has been developed for the preparation of phosphorus-containing sucrose polyols.

Now, in accordance with this invention, a process has been found for the preparation of phosphorus-containing sucrose polyols which comprises adding an acid of phosphorus to sucrose in the presence of a diluent while maintaining the temperature between about 0° C. and 50° C., and thereafter contacting the sucrose-acid reaction mixture with an alkylene oxide at a temperature between about 20° C. and about 100° C. Basically, the process of this invention involves two steps. The first step, the formation of the sucrose-acid reaction mixture, is the key to the invention for it has now been found that a phosphorus-containing sucrose polyol can only satisfactorily be prepared by careful control of the variables during this reaction. The second step, the reaction of the sucrose-acid reaction mixture with an alkylene oxide, is relatively straightforward, but here too, careful control of the reaction variables is important.

Three basic reactants are employed in the preparation of the phosphorus-containing sucrose polyols in accordance with this invention. They are: sucrose, an acid of phosphorus, and an alkylene oxide.

Various acids of phosphorus may be used in the process of this invention. Illustrative acids include the phosphoric acids such as 85% phosphoric acid, 100% phosphoric acid, 105% phosphoric acid, 115% phosphoric acid; phosphorus acid; the phosphonic acids such as chloromethyl phosphonic acid, phenyl phosphonic acid, trichloromethane phosphonic acid and hydroxymethyl phosphonic acid; phosphonous acid; the phosphinic acids such as diphenyl phosphinic acid, phenyl phosphinic acids and methyl phosphinic acid; and phosphinous acid. Partial esters of phosphoric, phosphorous, phosphonic and phosphonous acids may also be employed, as well as mixtures of any of the above acids and acid esters. Preferred acids are the phosphoric acids.

Alkylene oxides which may be used in accordance with this invention include ethylene oxide, propylene oxide, the isomeric normal butylene oxides, hexylene oxide, octylene oxide, dodecene oxide, methoxy and other alkoxy propylene oxides, styrene oxide, cyclohexene oxide and the diglycidyl ether of Bisphenol A. Halogenated alkylene oxides may also be used, such as epichlorohydrin, epiiodohydrin, epibromohydrin, 3,3-dichloropropylene oxide, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed. The process of this invention is particularly applicable to lower alkylene oxides containing from two to four carbon atoms and, more particularly, to propylene oxide.

The amount of alkylene oxide employed in accordance with this invention is such that the resulting phosphorus-containing sucrose polyol is neutral, i.e., that each acid hydroxyl group has reacted with the alkylene oxide. For example, if one mole of 100% phosphoric acid is used, at least six moles of propylene oxide, nine moles of ethylene oxide or five moles of butylene oxide or epichlorohydrin should be used. The amount of sucrose employed will vary considerably, depending upon the percent of sucrose desired in the final polyol product. Polyols containing approximately fifteen percent sucrose, based on the total weight of the polyol, have been prepared by the process of this invention.

In carrying out the process of this invention, an acid of phosphorus is added gradually to sucrose in the presence of a diluent, maintaining the temperature between about 0° C. and 50° C., preferably between about 25° C. and about 40° C. It is critical that the temperature be maintained within the stated range. If the temperature is above 50° C., discoloration of the sucrose-acid reaction mixture occurs. Furthermore, the product chars and makes difficult the reaction with the alkylene oxide. If the temperature is below 0° C., the reactants are difficult to stir and the polyol product normally gels. Furthermore, it is not commercially practical to operate under 0° C. It should be noted that if the addition of the acid of phosphorus to the sucrose is not gradual, it will be extremely difficult to maintain the temperature within the indicated range. Accordingly, proper control of the addition is necessary.

The sucrose-acid reaction mixture is then further reacted with an alkylene oxide, at a temperature between about 20° C. and about 100° C., the majority of the reaction preferably being conducted between about 60° C. and about 80° C. The early stages of the reaction will be conducted at the temperature of the sucrose-acid reaction mixture which will, in all instances, be less than 50° C. Generally about one-third of this reaction occurs at temperatures less than 50° C. The alkylene oxide may be added to the sucrose-acid reaction mixture or the reaction mixture may be added to the alkylene oxide. It is preferred to carry out the adduction reaction in the presence of a diluent; more preferably, the same diluent as is used in the preparation of the sucrose-acid reaction mixture.

A number of diluents may be used in accordance with this invention. The only requirement is that the diluent be compatible with the acid of phosphorus. The term "diluent" as used herein includes those liquids which are true solvents for the reactants, especially the sucrose, as for example water. Illustrative of the diluents utilizable herein are: water; organic esters such as ethyl acetate and butyl acetate; organic ketones such as methyl ethyl ketone; ethers such as dioxane; alkyl nitriles such as acetonitrile; polyhalogenated aliphatic hydrocarbons such as chloroform and methyl chloroform; alkyl phosphates and phosphonates such as triethyl phosphate, and dimethylbutyl phosphonate; dialkyl sulfoxides such as dimethyl sulfoxide; aromatic hydrocarbons such as benzene and toluene and cyclic ethers such as tetrahydrofuran. Water is the preferred diluent.

The following examples serve to illustrate the invention. All parts are by weight unless stated otherwise.

EXAMPLE I

A reaction vessel equipped with stirrer, thermometer, reflux condenser and heat exchanger means was charged with 30 parts of sucrose and fifteen parts of water. Then, 81 parts of 100% phosphoric acid was added slowly with good agitation, maintaining the reaction temperature around 25° C.

Over a period of about two hours, 346.5 parts of propylene oxide was added to the phosphoric acid-sucrose reaction mixture. After approximately 100 parts of propylene oxide was added, the temperature was allowed to climb to about 70° C. The reaction mixture was then stripped for two hours at 80° C. under about one millimeter of mercury. The recovered product (467 parts) was a homogeneous light-colored product which had the following properties: Hydroxyl number—520; acid number—41.3, and percent $P_2O_5$—12.5.

EXAMPLE II

A reaction vessel equipped as in Example I was charged with 80 parts of sucrose. Then, 100 parts of 85% phosphoric acid was added slowly, maintaining the reaction temperature around 15° C. To the reaction mixture, 661.6 parts of propylene oxide was added slowly over a period of about four hours. The temperature rose to about 80° C. during the addition and it was maintained there for two hours. After stripping the volatiles from the reaction mixture at 80° C. under about one millimeter of mercury, 626 parts of a homogeneous yellow liquid was obtained which demonstrates that a phosphorus-containing sucrose polyol had been prepared since free sucrose, being insoluble in a phosphorus-containing polyol, would precipitate out if present therein.

EXAMPLE III

A vessel equipped as in Example I was charged with 114 parts of sucrose dissolved in 50 parts of water. Then, 83 parts of 115% phosphoric acid was added slowly while the temperature was maintained around 40° C. After the addition of the acid, 758.4 parts of propylene oxide was added slowly over a period of six hours. The temperature climbed to between about 60° C. to 70° C. After the volatiles were stripped as in Example I, 898 parts of product was obtained with the following properties: Hydroxyl number (calculated)—600, and acid number 0.32.

Thirty-two parts of the phosphorus-containing sucrose polyol prepared above was compounded along with eighteen parts of tolylene diisocyanate, three parts of a blowing agent and 0.3 parts of a silicone stabilizer. A rigid, self-extinguishing foam resulted.

EXAMPLE IV

A reaction vessel equipped as in Example I was charged with 100 parts of 115% phosphoric acid. Then, 75.5 parts of sucrose was added slowly and the reaction mixture was stirred for one hour. Without the presence of a solvent, it was extremely difficult to maintain the temperature below 50° C. and at times during this addition the temperature climbed above 50° C., accompanied by considerable discoloration of the reaction mixture.

To the reaction mixture, 222.5 parts of propylene oxide was added slowly over a period of three and one-half hours as the mixture darkened. After refluxing for two hours and removing the volatiles by distillation at about 80° C. under about one millimeter of mercury for about three hours, 187 parts of a viscous, black material which contained decomposed sucrose particles was obtained. This example illustrates the necessity of carrying out the reaction between sucrose and the phosphoric acid in the presence of a diluent.

EXAMPLE V

A reaction vessel equipped as in Example I was charged with 100 parts of sucrose in 23 parts of water. Then, 154.7 parts of 115% phosphoric acid was added slowly with stirring but without regard to temperature control. As the temperature rose above 50° C., the mixture began to discolor rapidly. The subsequent reaction with propylene oxide (836 parts) yielded a highly colored product which is unsatisfactory for use in polyurethane compositions.

EXAMPLE VI

A reaction vessel equipped as in Example I was charged with 30 parts of sucrose and 25 parts of benzene. While maintaining the temperature around 25° C., 100.5 parts of 100% phosphoric acid was then added to the sucrose-benzene system.

After the addition of the acid, 428.5 parts of propylene oxide was added over a period of four hours as the temperature rose to about 68° C. The reaction mixture was refluxed there for about two hours. After stripping for two hours at 80° C. under two millimeters of mercury, 460 parts of product was obtained. The product had a hydroxyl number of 500 (calculated) and analyzed 16.3% $P_2O_5$ and 0.28 acid number.

EXAMPLE VII

To a reaction mixture prepared from 30 parts of sucrose and 100 parts of 85% phosphoric acid, 400 parts of ethylene oxide are added following the general procedure of Example I. After the volatiles are stripped, 510 parts of product are obtained.

EXAMPLE VIII

The general procedure of Example I is duplicated with the exception that 102 parts of phosphorus acid and 833 parts of epichlorohydrin are used in lieu of phosphoric acid and propylene oxide. After the volatiles are stripped, 905 parts of product are obtained with results comparable to those obtained in Example I.

We claim:

1. A process for the preparation of phosphorus-containing sucrose polyols which comprises adding an acid of phosphorus to sucrose in the presence of a diluent while maintaining a temperature between about 0° C. and about 50° C. and thereafter contacting the sucrose-acid reaction mixture with an alkylene oxide at a temperature between about 20° C. and about 100° C.

2. A process which comprises adding an acid of phosphorus to sucrose in the presence of a diluent while maintaining a temperature between about 0° C. and about 50° C., thereafter contacting the sucrose-acid reaction mixture with an alkylene oxide at a temperature between about 20° C. and about 100° C. and thereafter recovering a phosphorus-containing sucrose polyol.

3. The process of claim 1 wherein the acid of phosphorus is 85% phosphoric acid.

4. The process of claim 1 wherein the acid of phosphorus is 100% phosphoric acid.

5. The process of claim 1 wherein the acid of phosphorus is 115% phosphoric acid.

6. The process of claim 1 wherein the alkylene oxide is ethylene oxide.

7. The process of claim 1 wherein the alkylene oxide is propylene oxide.

8. The process of claim 1 wherein the alkylene oxide is epichlorohydrin.

9. The process of claim 1 wherein the diluent is water.

10. A process for the preparation of a phosphorus-containing sucrose polyol which comprises adding an acid of phosphorus to sucrose in the presence of water while maintaining a temperature between 20° C. and about 40° C. and thereafter adding to the sucrose-acid reaction mixture an alkylene oxide at a temperature between about 20° C. and about 80° C.

11. The process of claim 10 wherein the acid of phosphorus is 85% phosphoric acid.

12. The process of claim 10 wherein the alkylene oxide is propylene oxide.

References Cited

UNITED STATES PATENTS

| | | | |
|---|---|---|---|
| 2,052,029 | 8/1936 | Harris | 260—234 |
| 3,098,065 | 7/1963 | Crecelius et al. | 260—234 |
| 3,102,114 | 8/1963 | Komori | 260—234 |
| 3,103,507 | 9/1963 | Knoevenagel | 260—234 |
| 3,251,828 | 5/1966 | Dutz | 260—234 |

LEWIS GOTTS, *Primary Examiner.*

E. L. ROBERTS, *Examiner.*

J. R. BROWN, *Assistant Examiner.*